H. C. FORD.
BATTLE TRACER.
APPLICATION FILED AUG. 4, 1914.

1,293,747.

Patented Feb. 11, 1919.
5 SHEETS—SHEET 1.

WITNESSES:

INVENTOR.
H. C. Ford
BY Herbert H. Thompson
ATTORNEY.

H. C. FORD.
BATTLE TRACER.
APPLICATION FILED AUG. 4, 1914.

1,293,747.

Patented Feb. 11, 1919.
5 SHEETS—SHEET 3.

WITNESSES:
Charles H. Conner
Albert W. Stringham

INVENTOR.
H.C.Ford
BY Herbert H. Thompson
ATTORNEY.

H. C. FORD.
BATTLE TRACER.
APPLICATION FILED AUG. 4, 1914.

1,293,747.

Patented Feb. 11, 1919.
5 SHEETS—SHEET 4.

WITNESSES:
Charles H. Caun
Albert W. Stringham

INVENTOR.
H. C. Ford.
BY Herbert H. Thompson
ATTORNEY.

UNITED STATES PATENT OFFICE.

HANNIBAL CHOATE FORD, OF BROOKLYN, NEW YORK, ASSIGNOR TO THE SPERRY GYROSCOPE COMPANY, OF BROOKLYN, NEW YORK.

BATTLE-TRACER.

1,293,747. Specification of Letters Patent. Patented Feb. 11, 1919.

Application filed August 4, 1914. Serial No. 855,032.

*To all whom it may concern:*

Be it known that I, HANNIBAL CHOATE FORD, a citizen of the United States, residing at Brooklyn, N. Y., have invented certain new and useful Improvements in Battle-Tracers, of which the following is a specification.

This invention relates to an instrument which will move over a chart and indicate at each instant both the nautical position of the ship on which the instrument is placed and of another ship or object. The instrument may also record on the chart the course of either or both of the ships. The principal object of the invention is to design an instrument by which the commander of a war vessel may have before him a plan of the battle as it progresses, showing the relative position and heading of the two ships at every instant. Another object is to improve the construction of ship's course indicators, or recorders, and the controlling mechanism therefor. Other objects will appear as the description proceeds.

Referring to the drawings in which the preferred embodiments of my invention are illustrated:

Figure 1:
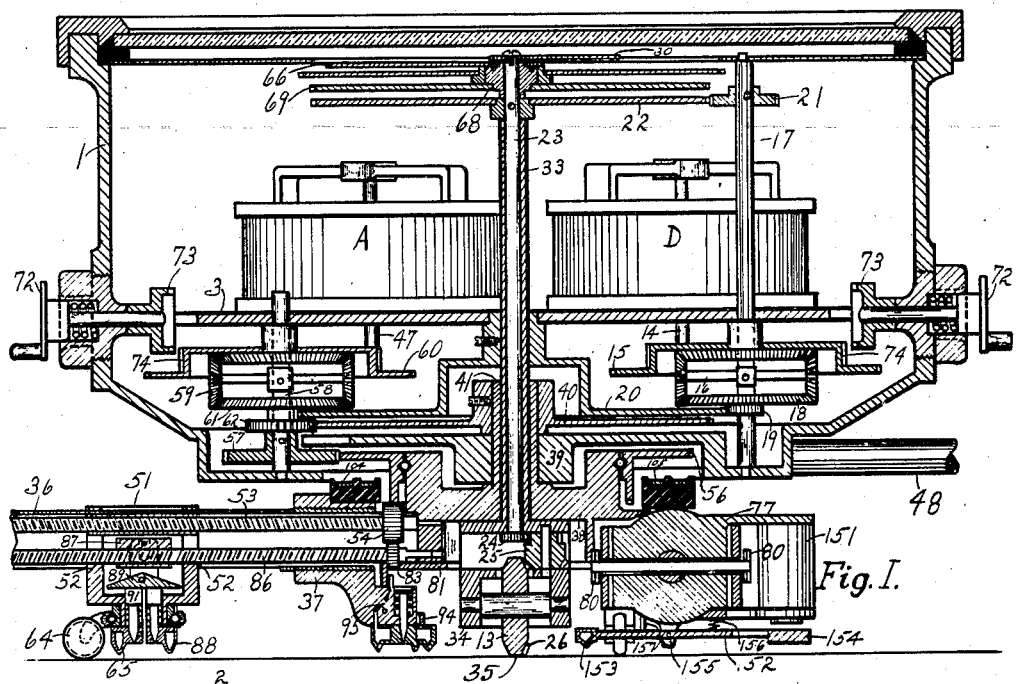
Figure 1 shows a central cross section on line 1—1 of Fig. 3 of one form of my invention.

The instrument which forms the subject matter of this invention is designed to propel itself over a tracing sheet in an equivalent direction and at a speed proportional to that of the ship, to record on said sheet the ship's course, to indicate the distance traveled and the points of gun fire, and also to show at each instant the position of a target or enemy by moving a secondary carriage in an equivalent direction and at a speed proportional to that of the target or enemy and by recording on said sheet the enemy's course. The instrument contains in one casing all of the secondary actuating means to accomplish the above noted results, my invention as it is used in practice being shown in Fig. 4. It is free to move on the chart in every direction, but is held from rotating about its own vertical axis by a system of parallel linkage or other means, in order that the instrument may preserve a sense of direction.

More specifically my device is made in the form of a relatively small portable casing or frame 1, which incloses the mechanism and which may be provided with a glass window 2. Within the casing is contained mechanism for both driving a friction roller 13 and turning it about a vertical axis, so that the casing propels itself over the chart at a speed proportional to that of the ship and in the same direction with respect to the arbitrary markings on the chart that the ship maintains in azimuth. Rigidly secured to the inside of this casing is a frame 3, which supports a plurality of actuating motors. Each of these motors is preferably of the step-by-step type (see Fig. 5) and is actuated from a different transmitter on different instruments on the ship. These instruments are illustrated diagrammatically in Fig. 5.

Motor A is actuated from a transmitter 7 on any instrument which will show the relative bearings of the target, such as target bearing telescope 8, and hence governs the angular position of the parts which show the direction of the enemy. This transmitter may be connected to some part of the target bearing telescope so as to be actuated thereby and may be of the form shown and described in connection with transmitter 11 in Fig. 9. The contacts are made successively, each contact completing a circuit through the windings on a pair of poles on motor A, the soft iron armature being dragged around under the poles as they are magnetized.

Motor C is driven from a similar transmitter 9 on or operatively connected with any instrumentality which indicates the heading of the ship in azimuth and which I term a direction indicator. It is shown as connected with a master compass 10, which is preferably of the gyroscopic type, and governs the direction of movement of the main instrument.

Motor D may be actuated from a transmitter 4 on any type of distance indicator 6. I prefer, however to drive said indicator from the propeller shafts 5 of the ship. When this is done, in order to secure accurate results, it is necessary to employ means to compensate for the difference in speed of the different propellers on the ship if it has multiple screws and also to correct for the loss of efficiency of the propellers at high speed and for current and weather conditions. All of these results are secured by my special type of distance indicator shown in Figs. 9 and 10, and represented in Fig. 5 as inclosed within box 6.

Figure 10:
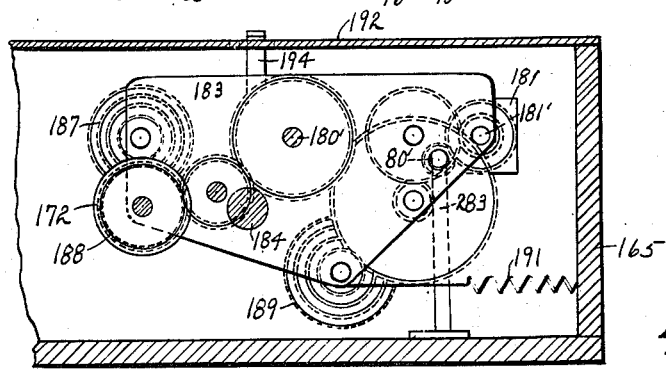
Fig. 10 is a diagrammatic section on line 10—10 of Fig. 9, showing the gearing used in said mechanism.
Figure 9:
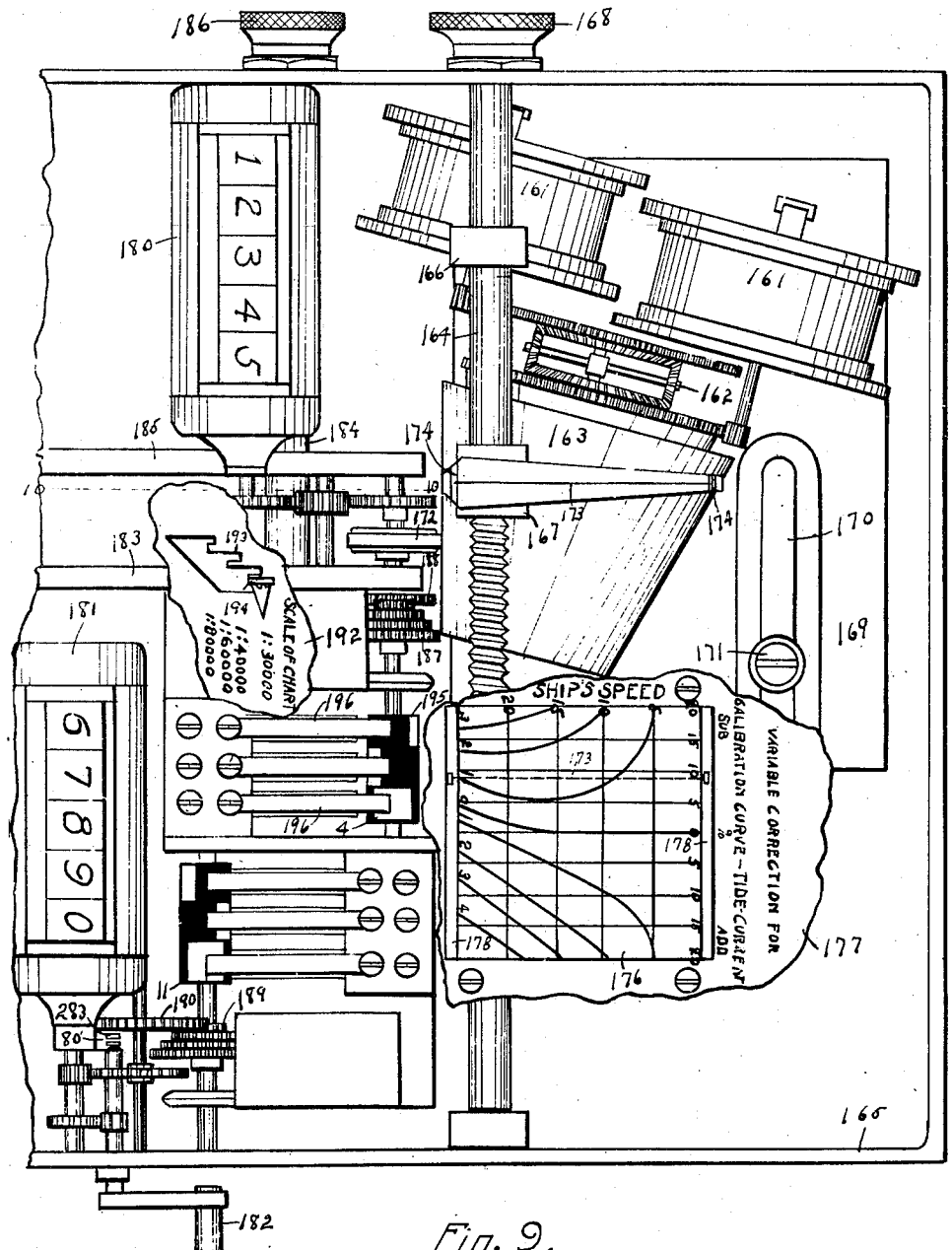
Fig. 9 is a plan development of the auxiliary control for the battle tracer.

Motor R receives its current from a transmitter 11 on or associated with any type of range indicator 181. This indicator may be a part of the primary range finder 12, or it may be a secondary instrument set by hand from the readings of the range finder 12. Figs. 9 and 10 show this latter type made as a part of the distance indicator referred to above. These figures will be described in detail hereinafter.

Considering the action of the motors from a slightly different standpoint, both motors D and R may be said to control the distances on the chart, and to be governed by master distance indicators, i. e., an indicator showing the distance traveled by the ship and an indicator showing the range of the enemy, while motors A and C govern the directions on the chart and are goverend by master direction indicators, i. e., a ship's heading indicator, and a target bearing indicator.

Figure 2:
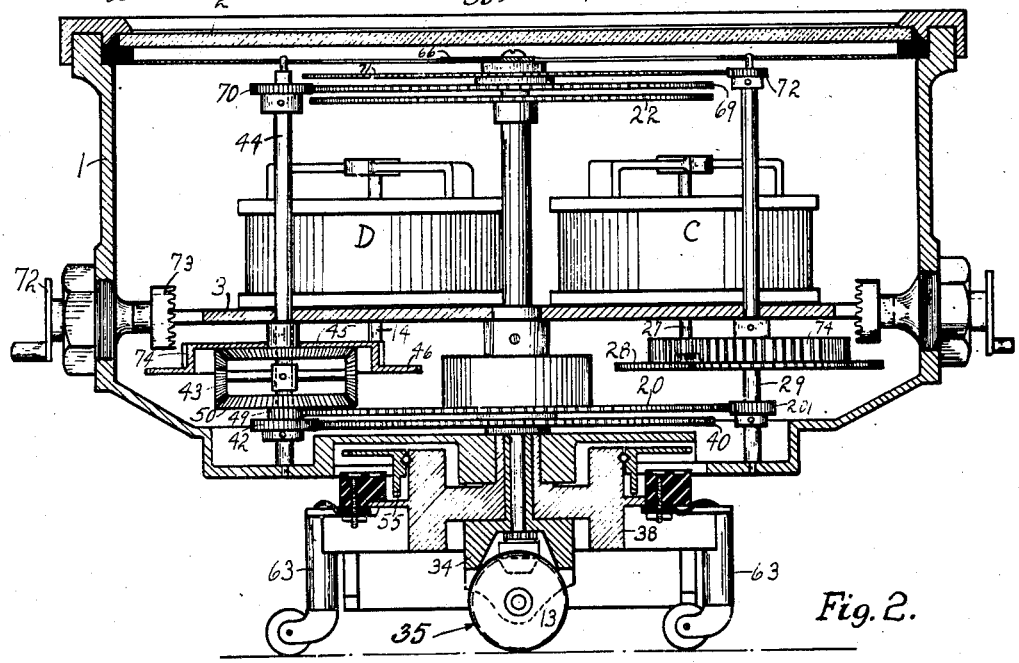
Fig. 2 shows a cross section taken at right angles to Fig. 1, on line 2—2 of Fig. 3.

The motor D is connected to the roller 13 so as to rotate it at a speed proportional to that of the ship by means of the transmission system shown in Figs. 1 and 2. A pinion (not shown but similar to pinion 27', on shaft 27) on the motor shaft 14 meshes with the large gear 15 which is rigidly connected to one arm of any type epicyclic or differential gearing. For the sake of clearness this train itself is shown in elevation.

The planetary arm 16 of the train is secured to the shaft 17, journaled in casing 1, and frame 3, while the third arm 18 carries a pinion 19 by means of which a compensating factor from the motor C is introduced through the large gear 20, hereinafter referred to. The shaft 17 transmits its motion to the roller 13 through the pinion 21, which drives gear 22 secured to a central shaft 23 by means of a collar. Adjacent the lower end of shaft 23 is secured a pinion 24 which drives a double faced gear 25, one face of which is beveled and drives a beveled gear 26 formed on roller 13. At the other end of shaft 23 may be secured a pointer 30 which coöperates with a suitable scale 31 to give an indication of the distance traveled by the ship and if timed will indicate the speed of the ship.

Returning now to motor C, which, it will be remembered, is actuated from the master compass and thus serves to govern the direction in which the casing 1 moves, it will be be seen by referring to Fig. 2 that this motor drives through a pinion 27' on its shaft 27 a gear 28 which is secured directly to shaft 29, journaled in the casing and frame. This shaft drives, through pinion 201, the gear 20, which as before noted is also geared to pinion 19. Said gear 20 is secured to a hollow shaft or sleeve 33 which is provided at its lower end with a cylindrical enlargement forming a housing 34 for roller 13 and gear 25. It will readily be seen that by this arrangement a simple and effective means is provided to govern the direction in which the whole casing moves, or, generically speaking, to control the direction of the relative motion between the chart and the tracer, by means of the same roller that imparts the translatory movement. Compensating connections 19 and 20 are provided so that a change in the directional plane of the roller 13 will not cause any rotation on its own axis, which rotation would otherwise be caused by the planetary action of gear 25. A positive drive between roller 13 and the chart is secured by means of teeth or serrations 35, which also serve as tracing means by making an impression L on the chart (see Fig. 4.) The electrical connections between the compass transmitter 9 and the motor C are such that the roller is turned about the vertical axis, when the ship turns, in the opposite direction from the apparent movement of the compass, or in other words in the same direction that the ship turns, so that the course traced on the fixed chart and the heading of the ship as shown by dial 71, hereinafter referred to, will have the same bearings with reference to the fixed indications on the chart or on scale 67 that the course and ship maintain in azimuth.

Coming now to the means I provide for indicating the course and position of the target or enemy, hereinafter referred to as the enemy, a rod 36 is used, which is rotatably mounted on the main casing 1. The rod is shown as secured in a projection 37 on an annular frame 38, which is journaled between a boss 39 on the bottom of the casing and the enlargement 34 on sleeve 33. Means are provided to impart angular movement to rod 36 such that it is maintained in the same relative position to arbitrary markings or points on the chart that the target bearing telescope maintains in azimuth. As a corollary to the above statement, it will be seen that the arm 36 also maintains the same angular position with respect to the dial 71, showing the heading of the ship, hereinafter referred to, that the target bearing telescope maintains with respect to the ship. Angular movement is imparted to frame 38 by means of a gear 40 secured to a sleeve-like extension 41 on frame 38. Gear 40 is driven from pinion 42 which is secured to one arm of the epicyclic gear train 43, by being secured to the shaft 44.

Figure 3:
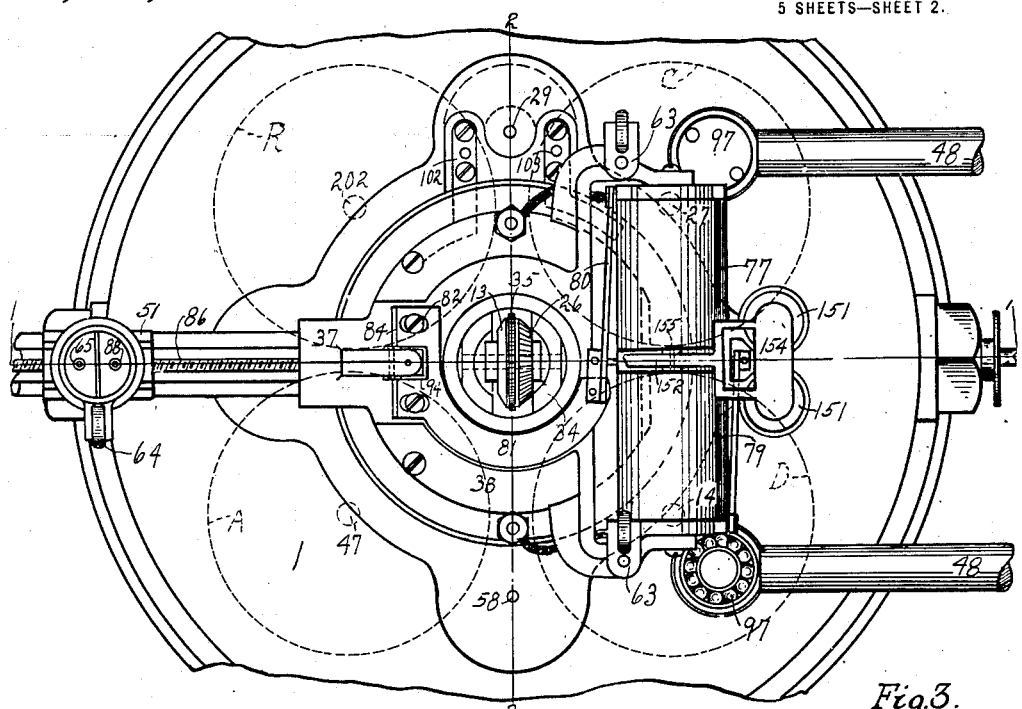
Fig. 3 is a bottom plan view with pen carriage 92 removed for the sake of clearness.

The driving arm of the train 45 is rotated by gear 46, which is driven from a pinion (not shown) on the shaft 47 of motor A. Since, when the ship is turned while the enemy remains still, the operator of the target bearing telescope 8 will turn it so as to keep it sighted on the enemy, and since the main casing 1 is held from rotation by means of the system of parallel linkage 48, it becomes necessary to compensate the ship's heading indicating means with the mechanism controlling the position of the rod 36. This is accomplished by means of pinion 49, which meshes with gear 20 and is rigidly connected to the third arm 50 of train 43. The exact position of the enemy on the chart is shown by the slide 51, which is kept on rod 36 at a distance from the tracing means 13 proportional to the range of the enemy by the following means:

Rod 36 is made in the form of a hollow tube open on the lower side to receive lugs 52 on the carriage 51, whereby the carriage is held vertical. Secured in the carriage is an elongated nut 52$^a$, which is threaded upon a long, threaded shaft 53 extended preferably the entire length of the tube 36 and journaled adjacent each end. Shaft 53 is fixed longitudinally, so that rotation of said shaft will impart translatory motion to carriage 51. This rotation is given by pinion 54, fixed on said shaft, which is driven by the crown gear 55. This gear is in the form of a hollow shaft, is journaled upon a hub portion of frame 38 as shown, and is also formed with gear teeth 56, which mesh with gear 57 fixed upon shaft 58. As in other forms, shaft 58 is secured to the central arm of the train 59. Said train is driven through gear 60 and a pinion on the shaft 202 of motor R, which does not appear in the sectional views, owing to the position of the sectional lines, but which is placed immediately in front of motor A, the four motors being symmetrically arranged around the central post (see dotted lines in Fig. 3) and being geared to the train of gearing which is immediately ahead of it in a counter-clockwise direction.

Figure 4:
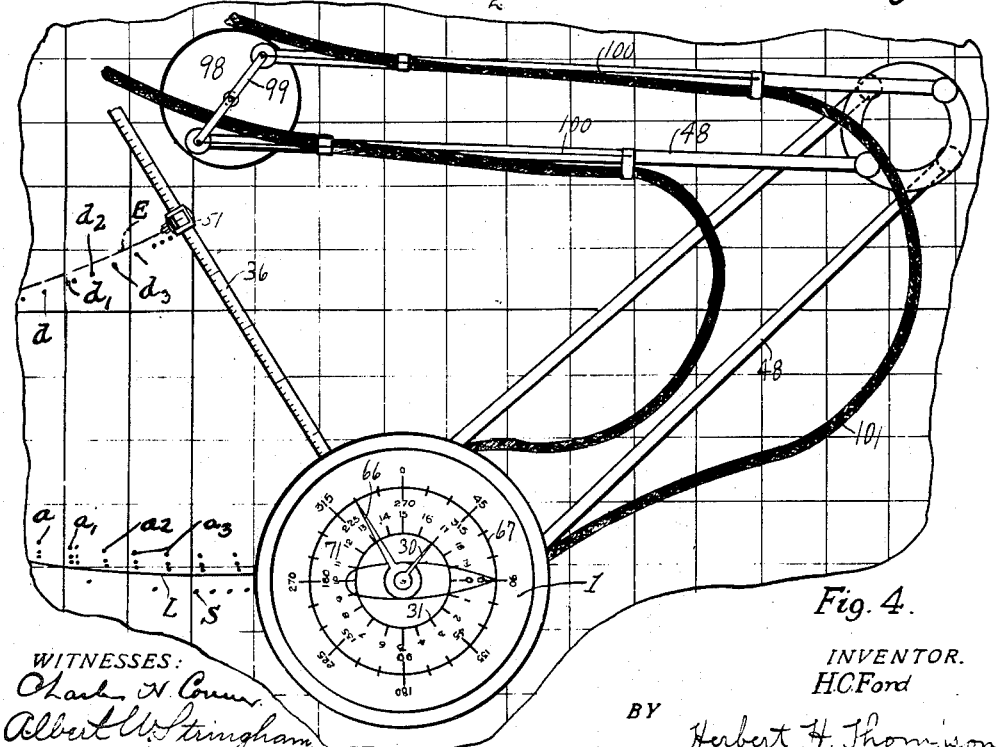
Fig. 4 is a top plan of a complete embodiment of my invention as it appears on the chart.

A compensating factor from both the target bearing motor and the master compass motor is introduced through the third arm 61 of train 59, which carries a pinion 62, driven from gear 40, the motor of which is governed conjointly by the target bearing and the compass motors as explained above. A supporting means for frame 38 and arm 36 may be provided in the form of legs 63, which carry swiveling rollers, and a roller 64 on the carriage 51. Tracing means on this carriage are also provided in the form of a movable pen 65, the action of which will be more fully set forth hereinafter. In Fig. 4, line E is traced by said pens, while the dots $d$ are produced by a time marker 88, pen 65 being lifted whenever said marker is depressed.

It will thus be seen that, by the mechanism I have so far described, I have produced in one compact instrument, an indicator which follows and partakes of every movement of both the ship on which it is placed and the enemy's ship. I wish also to point out that my device may be used simply to record the course of a ship. A glance at the indicator will show everything needed to direct the battle. In order that the indicator may show certain data without reference to the chart or position of the arm 36, a system of indicating dials and pointers may be provided. I prefer to drive these by the same motors used to drive the main mechanism. Pointer 30 has already been mentioned. The actual direction of the enemy is shown by pointer 66, which is read in connection with stationary scale 67, which is virtually fixed in azimuth and which is preferably graduated as a compass to show direction.

Said pointer is rotated by being secured to one end of the bushing 68, adjacent the other end of which is secured gear 69, which is driven by pinion 70 on the shaft 44. The heading of the ship is shown by rotatable scale 71, the periphery of which is provided with teeth so that it may be rotated from a pinion 72 on shaft 29. This scale is also read in connection with scale 67. It should also be noted that pointer 66 may be read in connection with scale 71, which will give the direction of the enemy relative to the ship. The scale 31 may be made upon the dial 71, as shown, since its position is immaterial.

Setting handles 72 for each train of gearing may be provided, so that the instrument may be brought in step with its controlling means, when it is set up. These handles are equipped with crown gears 73, which are normally held out of mesh with gears 74, which are secured to the driven gears 15, 28, 46 and 60 of the respective gear trains. By pushing in on a handle 72, it will be seen, a crown gear may be readily engaged with one of gears 74.

I prefer, also, to equip the tracer with a time recording means. This means is controlled electrically from a clock 75 (see Fig.

Figure 6:
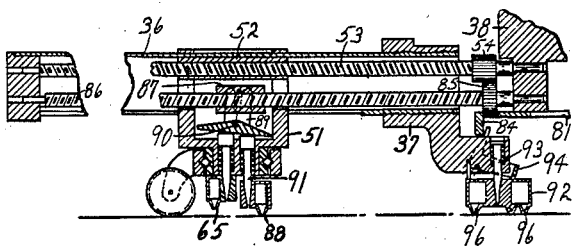
Fig. 6 is a detail.

5) which makes and breaks a contact 76 periodically. The electromagnet 77 which actuates the pens is placed in the time circuit. A solenoid 78 is also placed in this circuit which operates to break a second circuit when the clock circuit is on. Said second circuit contains electromagnet 79 and a button 80' on the range indicator 18, which the operator may close when he has indicator showing the proper range. It will be seen that by this arrangement, means are provided to throw magnet 79 out of circuit when the time controlled magnet 77 is energized. Magnet 79 is constructed to push armatures 80 to the left in Fig. 3 while magnet 77 pulls them to the right. Secured to the armature 80 is an arc-shaped arm 81, which is thus given a reciprocating motion. Arm 81 is slidably secured to the frame 38 by screws 82 working in slots in the arm. Adjacent one end, the arm 81 is provided with a slot 83 and an angle piece 84. The slots fits loosely but snugly a portion of pinion 85 secured to a long-threaded shaft 86, and driven by pinion 54. Shaft 86 is threaded oppositely from shaft 53, so that nut 87 will normally travel with, but independently from carriage 51. Nut 87 and the interior of carriage 51 are squared thus preventing rotation of the nut. Hence when arm 81 is moved, the whole shaft 86, carrying with it nut 87, is moved longitudinally. The pens 65 and 88 are alternately reciprocated by the reciprocation of nut 87 by means of the double bell crank lever 89, which is pivoted to carriage 51 at 90. Pen 65 is normally down, but is raised and pen 88 momentarily depressed when a circuit is closed by contact 76 on clock 75. The vertical arm of this lever is bifurcated to receive a pin on the nut 87. The pens are shown as secured to spring pressed rods 91 which normally hold them elevated as shown in Fig. 1, but which depress either one pen or the other when bell crank lever 89 is oscillated. Fig. 6 shows the time recording pen 88 in the act of recording on the chart.

The function of the angle piece 84 is to move the pen carriage 92 preferably simultaneously with pen 88. This carriage is supported by a spring pressed rod 93 and is moved from piece 84 by crank lever 94, which is pivoted at 95. The upstanding arms of the lever are in the path of movement of piece 84 so that the action shown in Fig. 6 takes place. I prefer to equip the carriage 92 with a plurality of alined pens 96, so that the chart will show the direction of the enemy at each period of the battle and also will indicate which dot $d, d^1, d^2, d^3$, etc., (see Fig. 4) adjacent the enemy's course E corresponds with which dot $a, a', a^2, a^3$, etc. on the ship's course L.

A further help toward the same end is to equip the time circuit so that every fifth mark (for instance) is distinctive, as by making it double, as at $a', d'$. The time indicating means is thus made to perform an additional function and hence may be properly termed a directive time recording means. Adjacent the recording roller is also secured means to record on the chart the firing of each salvo during the battle. This means is controlled from a button 150 placed in any convenient position so as to be controlled either automatically or by hand, when a salvo is fired. It comprises merely a solenoid 151, shown in the form of a pair of electromagnets secured to one side of the time magnets 77, 79. A lever 152 carrying at one end a pen 153, and at the other an armature 154 is pivoted at 155 on the magnet frame of the magnets 77, 79, so that on the magnets being energized, a dot $s$ will be recorded on the chart. A compression spring 156 and a stop pin 157 are provided to hold the pen normally off the chart. By mounting the salvo recorded on the rotatable carriage 38, the mark made on the chart will indicate at a glance the position of the ship at the time of the salvo, even though the mark be spaced a distance from the traced course, since the directive time marks will show in which direction the marks should be extended to cross the course.

The rods 48, which, as above explained, prevent the casing 1 from rotating, are swiveled to the bottom of the casing at 97. The block 98 which furnishes a reference point, and to which one end of the linkage is attached, is held in place on the chart merely by its own weight. It may be provided with a T-shaped upright 99 which carries wires 100 to hold the linkage up off the chart. The cables 101 carrying all the electrical conductors are shown as carried by the linkage.

Any form of sliding contacts may be used to communicate current to magnets 77 and 79, carried by frame 38. The drawings show a pair of brushes 102 and 103 mounted on the casing 1, which contact with annular insulated rings 104 and 105, respectively, which are supported on frame 38.

Figure 7:
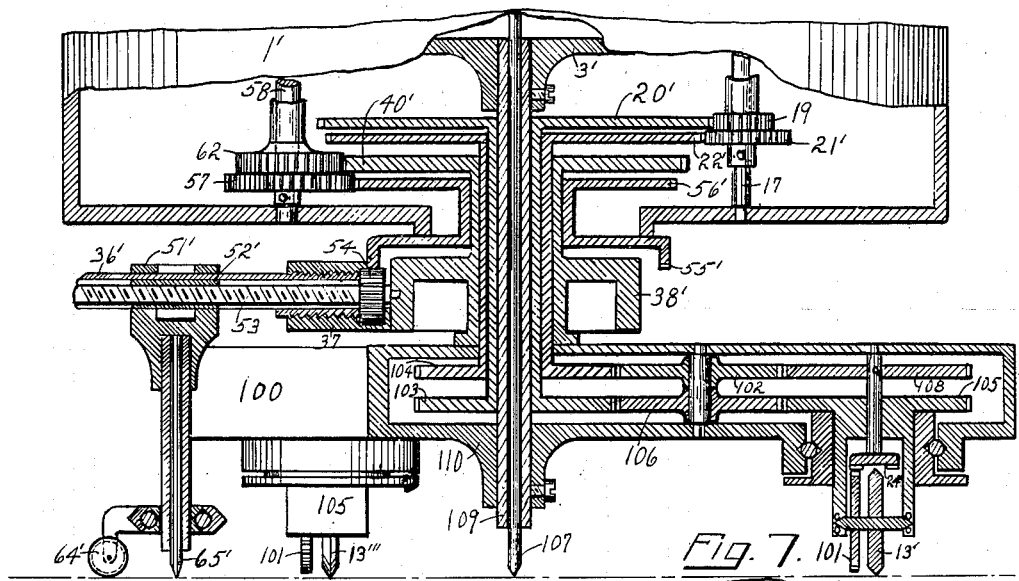
Fig. 7 is a cross section of a modified form of my invention, the section being taken on line 7—7, Fig. 8.
Figure 8:
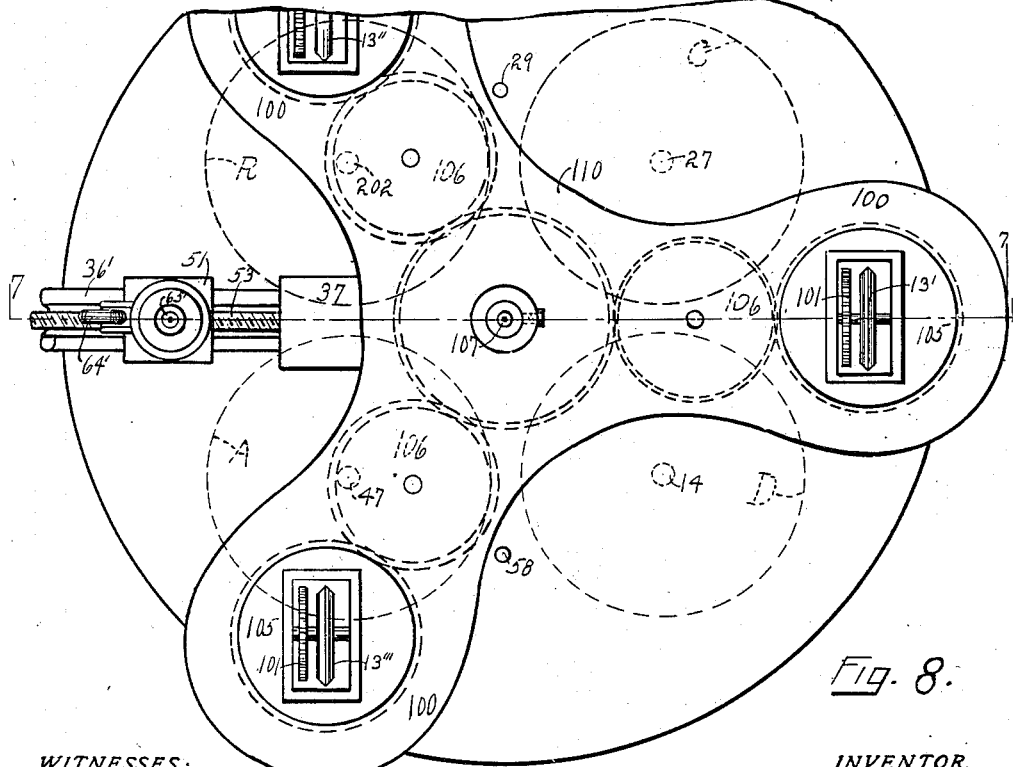
Fig. 8 is a bottom plan view of the same.

In Figs. 7 and 8 I have illustrated a modified form of my invention in which the linkage 48 is dispensed with. The drawing has also been simplified by the omission of time recording means. Since the driving and transmission system is preferably identical with that shown in Figs. 1 and 2, the motors and differential gearing have been omitted from Fig. 7. Modified parts have the same reference numerals, primed, as the corresponding parts in the main form, while parts that have not been changed have the same numeral.

In this form of the invention the main frame 1' or casing is kept from rotation about its own axis by providing a plurality of spaced driving and directing rollers, 13', 13″, and 13‴, which are supported in radial arms 100. The rollers are rotated on their axes by gears 101, which are driven from crown gears 24′. Idlers 102, mounted in the arms, transmit the rotation of gear 22′ and its sleeve to said crown gears through a gear 104 on the lower end of the sleeve and gear 108 on the shaft of the crown gear. It will be noted that all of the main driving gears, 20′, 22′, 40′ and 56′ are formed with or have secured thereto interfitting hollow shafts or sleeves. The directional plane in which the rollers rotate is governed by gears 105, concentric with the shaft of gears 24′. Gears 105 are rotatably mounted in the arms and carry either directly or indirectly the axles of the rollers. Rotation is imparted to gears 105 from gears 103 on the sleeve carrying gear 20′ through idlers 106.

The angular position of rod 36′ is governed by frame 38′ which carries 40′, as in the main form of the invention. Similarly, the position of the carriage 51′ on the rod 36′ is controlled through gear 54, crown gear 55′, and large gear 56′. The carriage 51′ carries a tracing means 65′. Since the rollers 13′, 13″, 13‴ are not positioned in the center of the casing, I provide a separate marking means 107 to record the course of the ship. It is obvious that this form of the invention may be provided with time recording means, similar to the main form. The arms 100 merge into a common central portion 110, which is secured to a central sleeve 109 by means of a projecting hub. This sleeve serves to secure the arms 100 to the main casing 1′ by being fixed to the frame 3′.

In Figs. 9 and 10, I have illustrated an auxiliary control instrument which corrects and converts the normal motions of the propeller shafts and the range finder so as to adapt them for transmission to the battle tracer. This instrument I term a revolution converter. The motors 161 are driven from transmitters not shown on the propeller shafts 5 of the ship. The number of motors used depends, of course on the number of screws on the ship. If the ship has more than one screw, differential gearing 162 is employed, through which the motors rotate a speed cone 163. Both the motors and the cone are suspended from a threaded shaft 164 journaled in casing 165 by means of a bearing block 166 and a nut 167, so that they may be moved longitudinally in the casing by rotating said shaft 164. A common base plate 169 is provided for the moving parts which plate is provided with a slot 170, so that the whole constitutes a sliding carriage. A pin 171 is fixed to the base of the casing 165 and fits in said slot so as to guide the carriage. A friction roller 172 bears against speed cone 163 and is adapted to be rotated at different speeds according to the position of the cone. An indicating means is provided to govern the position of the cone. It is shown as a fine wire 173 stretched between lugs 174 rising from a plate 175 on nut 167. Said wire 173 is used as a cross hair on a fixed graduated plate 176. This plate is shown as moved down from its normal position in Fig. 9 in order not to hide the other parts. It is secured to the top plate 177 so that slots 178 are left for the lugs 174 to project through, wire 173 being supported above the plate.

It is well known, that, while a ship's speed is proportional to that of her propellers, through a certain range of speed, this law does not hold good at high speeds, the ratio following a curve such as 0—0, for the average ship. Each ship will of course have a characteristic curve of its own. Moreover current, tide, and weather conditions affect the ratio to some extent. Both of these variables are taken into account on plate 176, the first by curve 0—0, and the other by the remaining curves. They are plotted with reference to the line 0—0 as a base line, and are laid out as 1, 2, 3 and 4 knot corrections. The abscissæ on the chart, looking in the direction the numbers face represent the percent correction, while the ordinates are the speed of the ship in knots. The use of the chart is as follows. Suppose that the propellers showed a speed of 20 knots. Then if there were no other corrections the cross hair would be placed at the intersection of line 0—0 and line 20, which it will be seen, will move the speed cone up so friction roller will be driven at a less speed in proportion. If in addition there was a negative current correction of one knot, the cross hair would be placed at the intersection of line 1 (subtraction) and 20 knots. The correction would then amount to about seven percent as shown.

Figure 5:
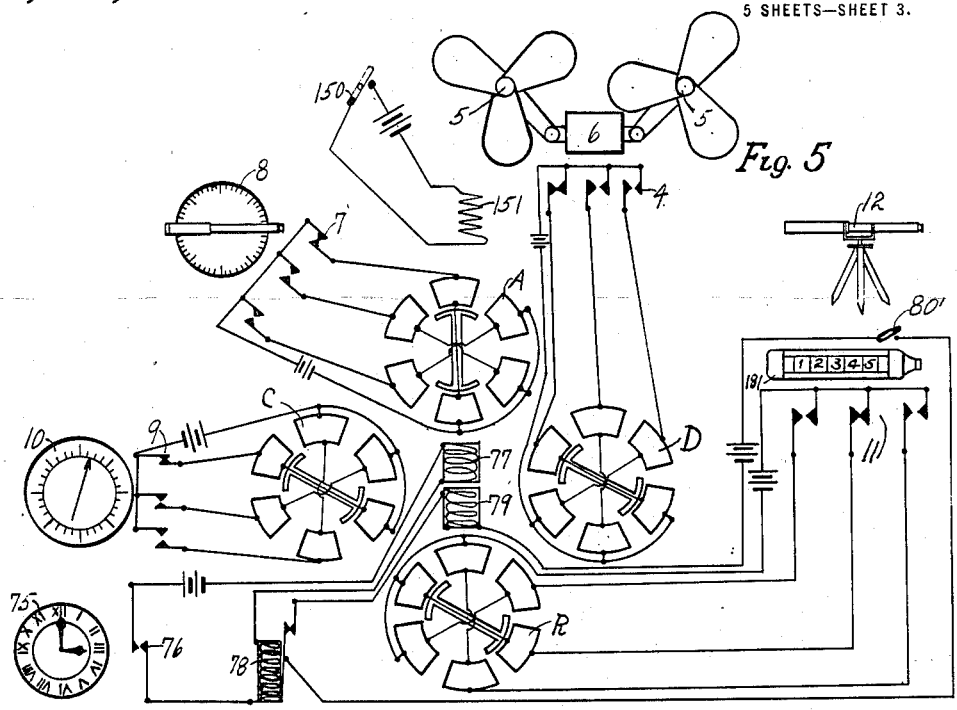
Fig. 5 is a diagrammatic view of the general outlay of the complete apparatus, showing the electrical circuits.

The friction roller 172 drives both the shaft 180′ of the distance recorder 180 and the transmitter 4, which controls motor D on the battle tracer. Adjacent this mechanism is mounted the hand operated range indicator 181, provided with shaft 181′ also geared to the handle 182, which operates the range indicator 181 and the transmitter 11, controlling motor R. These transmitters may be of any suitable form and are shown as constituting a three part revoluble commutator 195 and three brushes 196. Two diametrically opposite 90° sectors of each section of the commutator are of conducting material and such parts are arranged 30° ahead on each section. The wiring is illustrated in Fig. 5, in which the transmitters are represented as contact points operated so as to be brought into engagement successively, each contact being made twice per revolution.

Between the transmitters and their respective driving means I have shown a special system of change speed gearing whereby the scale of the chart made by the tracer may be changed at will. Both transmitters are mounted on a common support 183, which is fixed on a rod 184 journaled between the main frame 165, and a bracket 185. A knob 186 is provided on said rod so that the transmitters can be rotated on said rod, as a pivot by turning the knob and moved longitudinally with the rod. The shaft of the commutator on each transmitter is provided with a series of stepped gears, one of which meshes with a gear rotated from the driving means. The stepped gears 187 on the transmitter 4 are shown as mounted above the drive gear 188 on the shaft of friction roller 172, while gears 189 on transmitter 11 are mounted beneath the drive gear 190 driven from handle 182. By this means both step gears may be shifted simultaneously by simply turning the knob and pulling or pushing it to the proper position. A tension spring 191 secured to support 183 is provided to hold the gears normally in mesh. In order to hold the support in the proper positions, and in order to indicate the positions of the support which correspond to certain scales on the chart, I provide a slotted plate 192 fixed to main casing. Stepped notches 193 are made in the slot into which a finger 194 on the support 183 fits, each notch corresponding to one position of the step-gears. A pointer on the finger 194 reads on a scale on the plate as shown. The button 80', referred to above, which is in circuit with electro-magnet 79, is made of a contact strip 283 and a contact piece on the end of the shaft of handle 182. By pushing in on the handle 182 the circuit is closed and the tracing pen 65 is forced down on the chart.

The operation of the entire device is as follows: When it is desired to put the tracer into operation, the setting of handles 72 are made use of to synchronize the position of the various parts of the tracer with the controlling instruments. A convenient method of proceeding is first to synchronize the heading of the instrument, as shown by dial 71, with the compass reading. Then bring the pointer 66 around to zero on scale 71, since normally the target bearing telescope is kept on the lubber's line of the ship. Similarly, the range indicator may be kept normally at some predetermined position, so that the carriage 51 may be set in starting at this position. The circuits through the four motors may be closed and the operator or operators in charge of said telescope, and range indicator notified to bring his instrument or instruments to show the position of the enemy. As he does this the arm 36 will be kept in step automatically principally by the motor A. The motor R will also move the carriage 51 being actuated from the transmitter on the range indicator 181. It should be noted however, that no tracing will be made by the carriage 51 until the exact range is secured, since tracing pen 65 is normally in the position shown in Fig. 1 and is not depressed until the operator closes the circuit through solenoid 79 by means of button 80'. The time marks furnish ready means of determining the speed and distance covered by each ship and by my special directive arrangement of the marks, they will also show the relative position of the ships at each period of the battle, while the salvo recorder, will show precisely when each salvo was discharged.

While, in the body of the specification, I have described with great care and detail the exact construction of every portion of my device, in order that the operation may be perfectly clear, I wish it to be distinctly understood that the precise constructions are illustrative merely, and that the details may be varied without affecting the operation of my machine. I desire, therefore, that the scope of this invention be limited only by the scope of the appended claims.

Now having described my invention, what I claim and desire to secure by Letters Patent is:

1. A ship's course indicator comprising a feed roller adapted to produce relative movement between the tracing sheet and the indicator, driving means for said roller adapted to be controlled by a speed or distance indicator on the ship, means to govern the directional plane in which the roller rotates, adapted to be controlled by a compass and compensating gearing connecting said means, whereby a relative motion between the tracing sheet and indicator is produced which is proportional in amount and equivalent in direction to the velocity of the ship.

2. A ship's course indicator comprising a frame, a feed roller adapted to produce relative movement between the tracing sheet and the indicator, mounted rotatably and revolubly on the frame, driving means fixed in the frame for said roller, adapted to be controlled by a speed or distance indicator on the ship, means also fixed in the frame to govern the directional plane in which the roller rotates, adapted to be controlled by a compass, and means for preventing the rotation of the frame in azimuth connected to the frame.

3. A ship's course indicator, comprising a portable automobile frame containing and carrying propelling, directing and tracing mechanism adapted to propel itself over a tracing sheet in an equivalent direction and at a speed proportional to that of the ship and to record on said sheet the ship's course, and a system of visible indicating instrumentalities on said frame actuated by a predetermined portion of said mechanism, whereby the indicator at each instant shows the position, heading and distance traveled by the ship.

4. A ship's course indicator, comprising a frame, a feed roller adapted to produce relative movement between the tracing sheet and the indicator, mounted rotatably and revolubly on the frame, driving means fixed in the frame for said roller, controlled by a speed indicator of the ship, means also fixed in the frame to govern the directional plane in which the roller rotates, controlled by a compass, means for preventing the rotation of the frame in azimuth connected to said frame, whereby a relative motion between the tracing sheet and indicator is produced which is proportional in amount and equivalent in direction to the velocity of the ship, and an indicator showing the instantaneous heading of the ship mounted on the frame and actuated by said directing mechanism.

5. A ship's course indicator, comprising a feed roller adapted to produce relative movement between the tracing sheet and the indicator, driving means for said roller controlled by a speed or distance indicator on the ship, means to govern the directional plane in which the roller rotates, controlled by a compass, and a system of visible indicating instrumentalities actuated by said driving and governing means, whereby the indicator shows at each instant the position, heading and distance traveled of the ship.

6. A ship's course indicator, comprising a directing motor, adapted to be actuated from a compass, a driving motor, adapted to be actuated from a speed or distance indicator, a driving and directing roller, adapted to bear on the tracing sheet, said roller being swiveled on a central pivot at right angles to its axis of rotation, and an epicyclic gear train, interposed between said motors and said roller, whereby a change of direction will not affect the speed of rotation.

7. A battle tracer comprising an automobile frame, means on said frame for propelling it at a speed proportional to that of the ship, means for governing the direction in accordance with the heading of said ship, a ship tracing marker and a target tracing marker thereon, a support for said target marker revoluble on said frame, means for revolving said support in accordance with the target bearings, and means for varying the distance between said two markers in accordance with the range.

8. In a battle tracer, a device for indicating the range and direction of the enemy, comprising a main frame, a motor adapted to be actuated from a transmitter on a range indicator and a motor adapted to be actuated from a transmitter on a target bearing indicator, both of said motors being fixed in said frame, a rod pivoted on said frame, means through which the second mentioned motor may rotate the rod on its pivot, a slide on said rod, and means through which the first mentioned motor may operate said slide.

9. In a battle tracer, a device for indicating the range and direction of the enemy, comprising a main frame, a motor adapted to be actuated from a transmitter on a range indicator and a motor adapted to be actuated from a transmitter on a target bearing indicator, both of said motors being fixed in said frame, a rod pivoted on said frame, means through which the second mentioned motor may rotate the rod on its pivot, a slide on said rod, means through which the first mentioned motor may operate said slide, and compensating gearing interconnecting said transmission means, whereby rotation of the rod will not affect the position of the slide.

10. In a battle tracer, a device for indicating the range, relative speed and direction of the enemy, comprising a main frame, a motor actuated from a transmitter on a range indicator and a motor actuated from a transmitter on a target bearing indicator, both of said motors being fixed in said frame, a rod pivoted on said frame, means through which the second mentioned motor may rotate the rod on its pivot, a slide on said rod, means through which the first mentioned motor may operate said slide, compensating gearing interconnecting said transmission means, marking means on said slide, and means whereby said marking means is actuated periodically.

11. A battle tracer, comprising a main frame, tracing means connected to said frame adapted to trace the ship's course, a rotatable carriage mounted on said frame, a time recording means on said carriage adjacent said tracing means, a slide mounted on said carriage, tracing means on said slide adapted to trace the enemy's course and a time recording means on said slide adjacent said last named tracing means, and means whereby both of said time recording means are actuated simultaneously, whereby the tracing sheet will show the course, speed and relative positions of each ship at every period of its operation.

12. In a battle tracer, a device for indicating the range and direction of the enemy, comprising a main frame, a fixed dial on said frame, a pointer revoluble with respect to said dial, a motor adapted to be actuated from a transmitter on a range indicator and a motor adapted to be actuated from a transmitter on target bearing indicator, both of said motors being fixed in said frame, a rod pivoted on said frame, means through which the second mentioned motor may rotate the rod on its pivot and rotate said pointer, a slide on said rod, and means through which the first mentioned motor may operate said slide.

13. In a battle tracer, a tracing means adapted to record the course and speed of the enemy, comprising a radially movable arm, a slidable carriage on said arm, a plurality of threaded rods rotatably mounted in said arm, a fixed nut and a slidable nut in said carriage threaded on separate rods, a marker mounted on said carriage, operative connections between said slidable nut and said marker whereby movement of the nut will actuate the marker, means to rotate both said rods in unison and means to periodically reciprocate one of said rods with respect to the other.

14. In a battle tracer, a tracing means adapted to record the course and speed of the enemy, comprising a radially movable arm, a slidable carriage on said arm, a plurality of threaded rods rotatably mounted in said arm, a fixed nut and a slidable nut in said carriage threaded on separate rods, a plurality of markers mounted on said carriage, operative connections between said slidable nut and said markers whereby reciprocation of the nut will alternately actuate the markers, means to rotate both said rods in unison, and means to periodically reciprocate one of said rods with respect to the other.

15. In a battle tracer, a tracing means adapted to record the course, relative bearings and speed of the enemy, comprising a central post and a frame and arm revolubly mounted on said post, a movable marking means carried by said arm adjacent its inner end, a slidable arm provided with a slot and an angular projections, operative connections between said projection and the marking means, a radially movable arm, a slidable carriage on said arm, a plurality of threaded rods rotatably mounted in said arm, a fixed nut and a slidable nut in said carriage threaded on separate rods, a marker mounted on said carriage, operative connections between said slidable nut and said marker whereby movement of the nut will actuate the marker, means to rotate both said rods in unison, including a pinion secured to one of said rods, a portion of said pinion being embraced by said slot, whereby reciprocation of said slidable arm will reciprocate said rod, and means to periodically reciprocate said arm.

16. A battle tracer comprising a frame, a plurality of concentrically arranged shafts rotatably mounted in the frame, each of said shafts being operatively connected to a separate portion of the tracing mechanism, a concentric driving gear connected to each of said shafts, a plurality of motors arranged about said shafts in said frame and operative connections between said motors and shafts.

17. A battle tracer comprising a frame, a plurality of motors fixed in the frame, a plurality of gears arranged to positively drive the operating mechanism, one of said motors being positively geared to one of said gears, a plurality of trains of differential gears, each of the other motors being geared to one arm of one of said trains, another arm of two of said trains being geared to said first mentioned gear, the third arm of said two trains being positively connected to a second and third one of said main drive gears, respectively, one of said last mentioned drive gears being geared to a second arm of a third train, the third arm of said third train being geared to a fourth one of said main drive gears.

18. A battle tracer comprising a frame, a plurality of concentrically arranged shafts rotatably mounted in the frame, each of said shafts being operatively connected to a separate portion of the tracing mechanism, a concentric driving gear connected to each of said shafts, a plurality of motors arranged about said shafts in said frame and operative connections between said motors and shafts, one of said motors being positively geared to one of said gears, a plurality of trains of differential gearing, each of the other motors being geared to one arm of one of said trains, another arm of two of said trains being geared to said first mentioned gear, the third arm of said two trains being positively connected to a second and third one of said main drive gears, respectively, one of said last mentioned drive gears being geared to a second arm of a third train, the third arm of said third train being geared to a fourth one of said main drive gears.

19. A battle tracer comprising a frame fixed as a unit in azimuth, a plurality of motors fixed in the frame, driving and directing mechanism mounted in the frame, one of said motors being positively connected to one portion of said mechanism, two of said motors being connected to separate portions of said mechanism through a differential connection compensated with said first mentioned motor, a fourth motor being connected to a fourth portion of said mechanism through a compound differential compensated both with said first mentioned motor and one of said two motors.

20. A battle tracer comprising a main frame, ship tracing means connected to said frame, a rotatable carriage mounted on said frame, a directive time recording means on said carriage adjacent said tracing means, a slide mounted on said carriage, target tracing means on said slide, and a time recording means on said slide adjacent said target tracing means, and means whereby both of said time recording means are actuated simultaneously.

21. In a battle tracer, a recording means adapted to show the relative positions of the ship and a target at each instant comprising ship tracing means, target tracing means, and periodically and simultaneously operated marking means mounted adjacent each of said means, one of said marking means being adapted to make a directive indication, whereby the corresponding indication on the other course is shown graphically.

22. In a battle tracer, a recording means adapted to show the relative positions of the ship and target at a given instant comprising the combination with a course recording means for the ship and target, of simultaneously operated marking means mounted adjacent the course recording means of each, one of said marking means being adapted to make a directive indication, whereby the corresponding indication on the other course is shown graphically.

23. A battle tracer comprising a main frame, ship tracing means connected to said frame, a rotatable carriage, mounted on said frame, a directive time recording means on said carriage, adapted to make an indication which points in the direction of the target, a radially movable member mounted on said carriage, target tracing means on said member, and a time recording means on said slide adjacent said target tracing means and mounted in alinement with said directive recording means, and means whereby both of said recording means are actuated simultaneously.

24. A course indicator, comprising a portable automobile frame, propelling mechanism therein, adapted to propel it over a tracing sheet in an equivalent direction and at a speed proportional to that of the ship, and tracing and time recording means thereon for recording on the sheet the ship's course and speed.

25. A warship's automobile course recorder comprising a frame propelling mechanism thereon, adapted to propel it over a tracing sheet in an equivalent direction and at a speed proportional to that of the ship, directional tracing mechanism thereon for recording on the sheet the ship's course, and means also mounted thereon for recording points at which gunfire occurred.

26. A battle tracer comprising a main frame, ship tracing means and salvo recording means connected to said frame, a rotatable carriage mounted on said frame, a directive time recording means on said carriage adjacent said tracing means, a radially movable member mounted on said carriage, target tracing means on said member and a time recording means on the member adjacent said target tracing means, and means whereby both of said time recording means are actuated simultaneously.

27. A battle tracer comprising ship tracing means, target tracing means, and a recording means adapted to record on the chart adjacent the record made by one of said tracing means the points at which gun fire occurred.

28. A battle tracer comprising ship tracing means, target tracing means, time recording means adapted to make time indications adjacent each of said tracing means, and a recording means, adapted to record on the chart adjacent the record made by one of said tracing means the points at which gun fire occurred.

29. In a battle tracer a recording means adapted to show the relative positions of the ship and a target at each instance comprising a periodically and simultaneously operated marking means mounted adjacent the course of each, salvo marking means mounted adjacent one of said time marking means adapted to record the point at which gun fire occurred, one of said marking means being adapted to make a directive indication whereby the corresponding indication on the other course and the exact point of gunfire are shown.

30. A corrective device for the control of ship's course and distance recorders, comprising variable speed gearing adapted to be driven from a propeller shaft, a chart provided with plotted curves showing the true speed of the ship corresponding to different speeds of the propeller and indicating means coöperating with said chart and connected to said change speed gearing whereby said gearing may be set according to the chart so that the true speed of the ship will be transmitted to the course and distance recorder.

31. A corrective device for the control of ship's course and distance recorders comprising variable speed gearing adapted to be driven at the mean propeller speed, a chart provided with plotted curves showing the true speed of the ship corresponding to the different speeds of the propeller and to different corrections for wind and current and indicating means for operating said chart and connected to said change speed gearing whereby said gearing may be set according to the chart.

32. In a ship's course recorder, a revolution converter comprising a transmitter adapted to control the distance traveled by the ship's course recorder, a change speed mechanism driven at the mean propeller speed, indicating means showing the position in which the change speed mechanism should be set, and a second change speed gearing connected between said transmitter and said first mentioned speed mechanism, and adapted to be set for recording the ship's course according to different scales.

33. In a ship's course recorder, a master distance indicator comprising a member adapted to be driven at the mean propeller speed, a movable friction roller driven by said member, a chart provided with plotted curves showing the true speed of the ship corresponding to different speeds of the propeller, and indicating means coöperating with said chart and connected to said friction roller whereby the true speed of the ship will be transmitted to the ship's course recorder.

34. In a battle tracer, an auxiliary control mechanism for the range indicating portions of the tracer comprising rotary range indicating mechanism, a transmitter in circuit with said portions of the battle tracer and change speed gearing between said rotary mechanism and said transmitter whereby the scale of the chart may be varied.

35. In a battle tracer, an auxiliary control mechanism for those portions of the tracer that govern the distance indications on the chart, comprising a rotary distance indicator and a rotary range indicator a pair of sets of change speed gears mounted on a common pivoted and slidable support, one of said sets being adapted to be driven by said distance indicator while the other is driven by said range indicator, and a transmitter connected to each set, whereby the scale of the chart may be varied.

36. In a battle tracer, means to govern the scale of the tracing adapted to be placed between the respective master indicators of distance and the battle tracer comprising change speed mechanism connected to each indicator, a common means of shifting said change speed mechanisms and a common indicating means connected to said mechanisms adapted to show the scale of the chart corresponding to the various said mechanisms.

37. In a battle tracer, means to govern the scale of the tracing adapted to be placed between the respective master indicators of distance and the battle tracer comprising change speed mechanism connected to each indicator, a common pivoted and slidable support for said mechanisms, adapted to shift both mechanisms simultaneously, a pin on said support and a notched, graduated plate adapted to receive said pin and hold said mechanisms in a predetermined position, whereby the scale of the chart may be varied and indicated.

38. In a battle tracer, an auxiliary control mechanism for those portions of the tracer that govern the distance indications on the chart comprising variable speed gearing adapted to be driven from a propeller shaft a chart provided with plotted curves showing graphically the true speed of the ship corresponding to different speeds of the propeller, and indicating means coöperating with said chart and connected to said change speed gearing whereby said gearing may be set according to the chart, a rotary range indicator mounted adjacent said gearing, transmitters indirectly connected to said gearing and to said indicator, change speed mechanism between each transmitter and its respective driving mechanism and a common means for shifting both of said change speed mechanisms.

39. In a battle tracer, an auxiliary control mechanism for those portions of tracer that govern the distance indications on the chart comprising a rotary distance indicator and a rotary range indicator, transmitters indirectly connected to said indicators and change speed gearing between said indicators and transmitters whereby the scale of the chart may be varied.

40. In a battle tracer, a tracing means adapted to show the range and course of the enemy, comprising a movable carriage, controlling motors adapted to move said carriage along the proper course, an electrically operated marker on said carriage, and a switch for actuating said marker whereby the enemy's course is only shown when the apparatus is brought to the proper range.

41. In a ship's course recorder, a revolution converter comprising a transmitter adapted to control the rate of relative movement between the recorder and chart, a change speed mechanism adapted to be driven at the mean propeller speed and connected to said transmitter and a member provided with plotted curves showing the position in which the change speed mechanism should be set.

42. In a battle tracer, an auxiliary control mechanism for the distance indicating portions of the tracer comprising rotary distance indicating mechanism, a transmitter in circuit with said portions of the tracer and change speed gearing between said rotary mechanism and said transmitter whereby the scale of the chart may be varied.

43. A recording instrument comprising a frame freely movable in one plane, but non-rotatable on its own axis, means for propelling and guiding said frame whereby it reproduces the movements of the ship, a rotatable arm on said frame, means for maintaining said arm in the same relative position on the chart that the target telescope maintains in azimuth, and tracing means on said arm.

44. A recording instrument comprising a frame freely movable in one plane, but non-rotatable on its own axis, means for propelling and guiding said frame whereby it reproduces the movements of the ship, a rotatable arm on said frame, means for maintaining said arm in the same relative position on the chart that the target telescope maintains in azimuth, tracing means on said arm and means for maintaining said tracing means at a distance from said frame proportional to the range.

45. A device adapted to trace the course of a target comprising a main frame arranged to propel itself over a chart in an equivalent direction and at a speed proportional to that of the ship, and target tracing means revolubly mounted on said frame and radially movable with respect thereto, so as to maintain the same relative position on the chart that the target maintains in azimuth.

46. A ship's course recorder comprising a portable frame, propelling and directing mechanism therein contained, a feed roller driven thereby, and a system of parallel links connected to said frame and anchored to a fixed part.

47. In a battle tracer system the combination with a range and a distance instrumentality, of a plurality of transmitters for transmitting the range and distance traveled, and change speed gearing between each transmitter and its actuating instrumentality.

48. In the battle tracer system, the combination with a range and a distance instrumentality, of a plurality of transmitters for transmitting the range and distance traveled, change speed gearing between each transmitter and its actuating instrumentality, and a single means for shifting both gears.

49. In a recording mechanism, an arm rotatable about an axis, a slide on said arm, a marker on said slide, a threaded shaft extending longitudinally of said arm to which said marker is connected, a second threaded shaft on which said slide is threaded, means for rotating both of said shafts to move said slide, and means for moving one of said shafts longitudinally with respect to the other for moving the marker on said slide.

In testimony whereof, HANNIBAL CHOATE FORD has signed his name to this specification in the presence of two subscribing witnesses, this 31st day of July, 1914.

HANNIBAL CHOATE FORD.

Witnesses:
FREDERICK CONRAD NAWESEN,
CARL L. NORDEN.